May 12, 1936.   G. T. BROWNE   2,040,642
ROPE THIMBLE
Filed Sept. 21, 1934
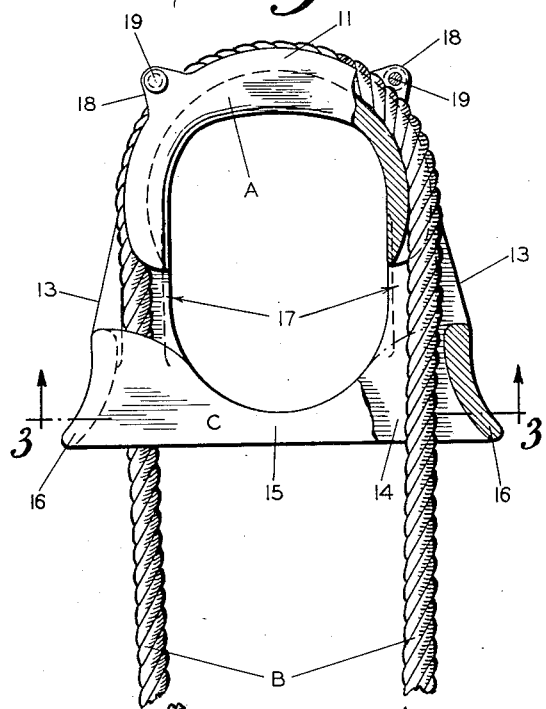
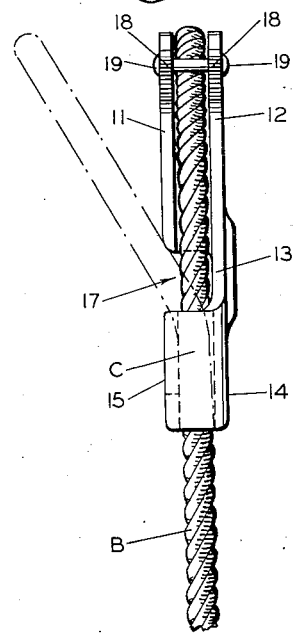
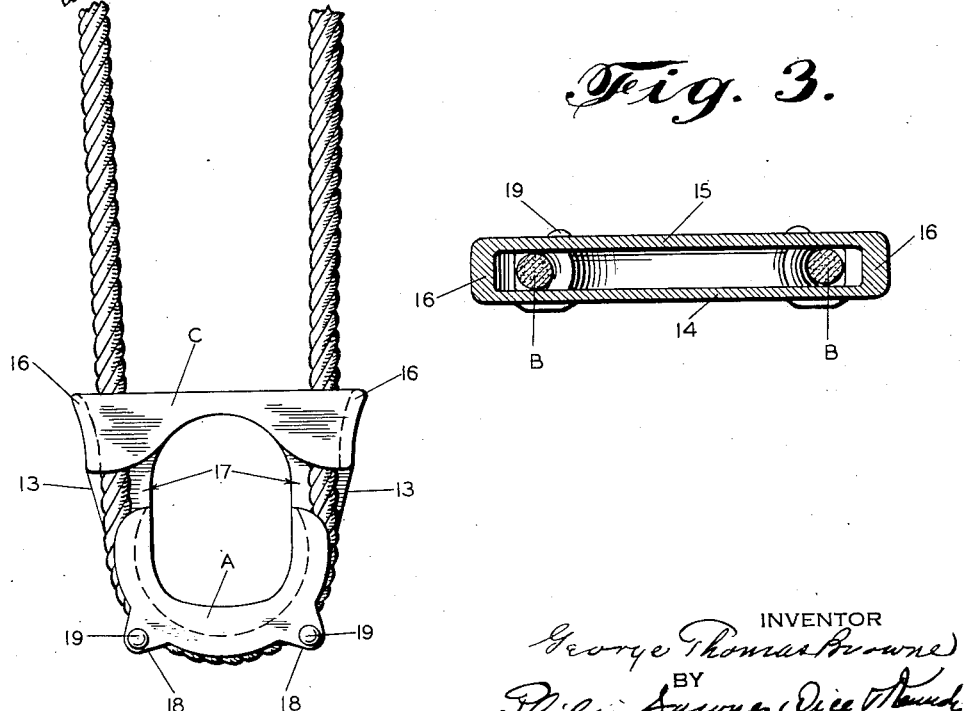
INVENTOR
George Thomas Browne
BY
ATTORNEYS Patented May 12, 1936

2,040,642

UNITED STATES PATENT OFFICE 2,040,642

ROPE THIMBLE

George Thomas Browne, Trenton, N. J., assignor to John A. Roebling's Sons Company, New York, N. Y., a corporation of New York Application September 21, 1934, Serial No. 744,938

4 Claims. (Cl. 114—115)

This invention relates to wire rope thimbles and especially to thimbles for wire rope grommets. Thimbles, as heretofore usually constructed, have necessitated the threading of the rope through the thimble or through a squeezer ring by which it was held in position upon the thimble, or the thimble was divided horizontally with the two parts placed upon the rope, with the rope and thimble parts held together by bolts or rivets. These are objectionable in that the first requires a free rope end for mounting and the second is only as strong as the bolts or rivets holding the parts together.

The object of the present invention is the provision of a simple, cheap and efficient thimble upon which a looped wire rope or a wire rope grommet may be readily and securely mounted.

In the accompanying drawing forming a part of this specification, there is shown a thimble embodying the features of the invention in their preferred form, and this construction will now be described in detail and the features forming the invention then specifically pointed out in the claims.

In the drawing:

Figure 1 is a plan view of a wire rope sling comprising a wire rope grommet with thimbles having the invention applied thereto, with a portion of the upper thimble broken away;

Figure 2 is an edge view of the upper thimble of Figure 1, indicating in dotted lines the method by which the grommet is mounted upon the thimble; and Figure 3 is a section on line 3—3 of Figure 2.

Referring to the drawing, the thimble comprises a suspension ring A suitably grooved or recessed upon its exterior to receive the wire rope of grommet B, which is retained therein by flanges 11, 12, upstanding from the opposite sides of the suspension ring A. The lower parts of the ring A are not brought together into a throat as is customary, but are cut off to leave two spaced depending arms 13 as shown. The flange 12 of the rope groove is continued downwardly beyond the end of each arm of the suspension ring A to provide these substantially flat arms 13, the inner surfaces of which preferably lie substantially in the plane of one flange. Depending from the arms 13 is a flattened rope-retaining ring or throat C forming a continuous enclosure for the rope and preferably formed as shown with continuous parallel side walls 14, 15, closed at their lateral edges by vertically extending end walls 16 flared downwardly and outwardly as shown. The rope-retaining side wall 14 preferably forms a smooth continuation of the arms 13 and the upper edge of the side wall 15 is suitably spaced from the lower portion of the suspension ring A to form therewith lateral openings 17, one on each side of the thimble.

As shown in dotted lines in Figure 2, the wire rope or grommet is bent to form a loop which is passed upwardly through the rope-retaining ring or throat C, then outward laterally through the openings 17, whereupon the looped end is passed over the upper end of the suspension ring A and drawn down into the groove therein.

On opposite sides of the upper end of the suspension ring A there are provided oppositely placed pairs of ears or lugs 18 through which ties 19, which may be rivets or bolts, are passed, these preferably having no binding action upon the wire rope of grommet B so that slip of the rope on the thimble is permitted to equalize the tension on the two parts thereof.

The thimble is proportioned according to the size of the wire rope in connection with which it is to be used and the component parts thereof preferably are cast integrally so as to form a single unit except for the ties 19.

What is claimed is:

1. A wire rope thimble having a suspension ring open at its lower end, a continuous loop-enclosing rope-retaining ring below the suspension ring, and supporting means on one side of said suspension ring connected to the rope-retaining ring and supporting the latter, the upper edge of said retaining ring being spaced from the suspension ring on the side opposite the support to permit the lateral passage of a rope loop passed through the rope-retaining ring.

2. A wire rope thimble having a suspension ring open at its lower end and formed with two spaced arms on one side of the ring, a rope-retaining ring below said suspension ring and carried by said arms at one side of the rings, the upper edge of said retaining ring being spaced from the suspension ring on the side opposite said arms to permit the lateral passage of a rope loop passed through the rope-retaining ring.

3. A wire rope thimble having suspension ring A grooved to form flanges 11, 12, on opposite sides of the groove, arms 13 on one side of the ring formed by extending one of said flanges, and rope-retaining ring C carried by said arms and having its upper edge spaced from the suspension ring on the side opposite said arms to permit the lateral passage of a rope loop passed through the rope-retaining ring.

4. A wire rope thimble having suspension ring A grooved to form flanges 11, 12 on opposite sides of the groove, arms 13 on one side of the ring formed by extending one of said flanges, rope-retaining ring C carried by said arms and having its upper edge spaced from the suspension ring on the side opposite said arms to permit the lateral passage of a rope loop passed through the rope-retaining ring, and ties 19 closing the suspension ring groove outside the rope.

GEORGE THOMAS BROWNE.